Inventor:-
Alexander Rava

March 18, 1941.  A. RAVA  2,235,385
WELDING METHOD AND APPARATUS
Filed March 23, 1939  2 Sheets-Sheet 2

Inventor:-
Alexander Rava

Patented Mar. 18, 1941

2,235,385

UNITED STATES PATENT OFFICE 2,235,385

WELDING METHOD AND APPARATUS

Alexander Rava, Jersey City, N. J.

Application March 23, 1939, Serial No. 263,579

24 Claims. (Cl. 219—8)

This invention relates to electric welding, and more particularly to methods and means for electric welding employing an electric discharge through a gap maintained between a suitable electrode and the work for uniting pieces of relatively thin gauge metal, or relatively thin gauge metal to relatively heavy stock, or for uniting metal pieces of relatively heavy stock.

The electric arc, as such gap discharge is usually termed, and particularly the direct current arc struck and maintained between any suitable electrode, consisting of carbon or metal, and the work, has been extensively used in industry for effecting continuous fusion weld while producing relative movement between the arc and the work in the direction of the length of the seam being formed. As heretofore proposed, however, such an arc is subject to instabilities, particularly with respect to its directional properties and its intensity, which result in serious deficiencies if such a welding procedure is employed for uniting pieces of relatively thin gauge metal, or a piece of relatively thin gauge metal to relatively heavy stock. Some of the defects thus introduced are pitting, burning, variation in melting intensity, gaps in the weld that cause leakage, cavitation, etc., which are seriously impairing the strength, density and ductility of the resulting seam.

The present invention has for an object the elimination of the above instabilities to render it possible to extend the application of fusion welding to very light gauge stock, and at the same time to provide improvements in the strength, density and ductility of the resulting seam in either light or heavy gauge stock.

Another object of this invention is to provide an electric fusion welding means and procedure which obtains an improved directional effect of the discharge proper. The external conditions, such as variations of the gap, magnetic blow, variations in electron-emissive properties either of the electrode used or of the work, etc., usually accompanying a fusion welding operation, are responsible to various extents in the processes heretofore employed for a number of deleterious effects, such as undue elongations of the discharge proper, deflection of same, shifting of the cathodic or anodic spots of same, etc. The present invention overcomes the foregoing causes of instability, as well as provides controlled uniformity of the discharge intensity by suppression of the so-called hysteresis effect.

Another object of this invention is to produce a high quality weld of superior density by the delivery of what may be called packets of energy capable of exerting a hammer blow effect at the junction between the pieces of metal to be united while said metal is molten.

Another object of this invention is to provide a welding system and procedure whereby the energy is delivered in rapidly recurring periods of relatively short duration, and reaching relatively high density values in such relatively short times, so that the metal at the joint is melted in a relatively small concentrated area to produce the union, and resumes its normal state without acquiring impurities from the surrounding atmosphere and the electrode, such as oxides, nitrides, carbides, etc., which by subsequent permeation of the bulk of the seam or partial or complete solution in the metal of same and resultant contamination thereof may interfere with the subsequent recrystallization of the seam region and produce cavities and other deleterious effects, which generally result in mechanical weakness of the joint.

Another object of this invention is to provide improved welding means and procedure which will produce a relatively strong gas-tight weld even with relatively thin stock.

Another object of this invention is to provide a weld of the type last characterized which is possessed of considerable ductility at the joint effected by the weld.

Another object of this invention is to provide a welding system and procedure whereby the area in which the metal is disturbed by the welding operation is confined to a relatively narrow zone along the edges of the metal pieces being joined whereby the physical characteristics of the surrounding metal are not disturbed.

Another object of this invention is to provide welding means and procedure which may be operated at a relatively high speed.

Another object of this invention is to provide a welding system and procedure employing means whereby the penetration effect can be conveniently and accurately controlled.

Another object of this invention is to provide welding means and procedure which may if desired be used without the employment of fluxes.

Another object of this invention is to provide a welding system and procedure which may be used in the uniting of metals such as aluminum that have heretofore been joined only with difficulty and with the use of relatively large quantities of fluxes.

Another object of this invention is to provide welding means and procedure which may be used for uniting a wide variety of metals having a wide variety of thicknesses and whether the pieces to be united are of the same or of different thicknesses.

Another object of this invention is to provide a welding system and procedure which may be used in making a strong and permanent butt weld between work pieces though one or both of said pieces be relatively thin.

Another object of this invention is to provide a welding system and procedure which produces an improved seam by fusion welding.

Another object of this invention is to provide welding means and procedure which avoid the necessity for highly complicated and expensive equipment.

Another object of this invention is to provide an electric weld which is strong and durable.

Other objects will appear as the description of the invention proceeds.

The invention is capable of receiving a variety of expressions, some of which are illustrated on the accompanying drawings and described hereinafter, but it is to be expressly understood that the invention is not limited to the embodiments illustrated and described, as it will be apparent to those skilled in the art that the principles hereinafter explained may be embodied in other systems and procedures than those specifically illustrated and described.

In the drawings—

According to the procedure of the present invention the welding is effected by fusion along a relatively narrow zone by employing an intermittent unidirectional electric discharge through a gap maintained between the electrode and the successive points of junction of the workpieces whereby improved directional control, high density and improved physical characteristics of the weld heretofore referred to are obtained.

Figure 1:
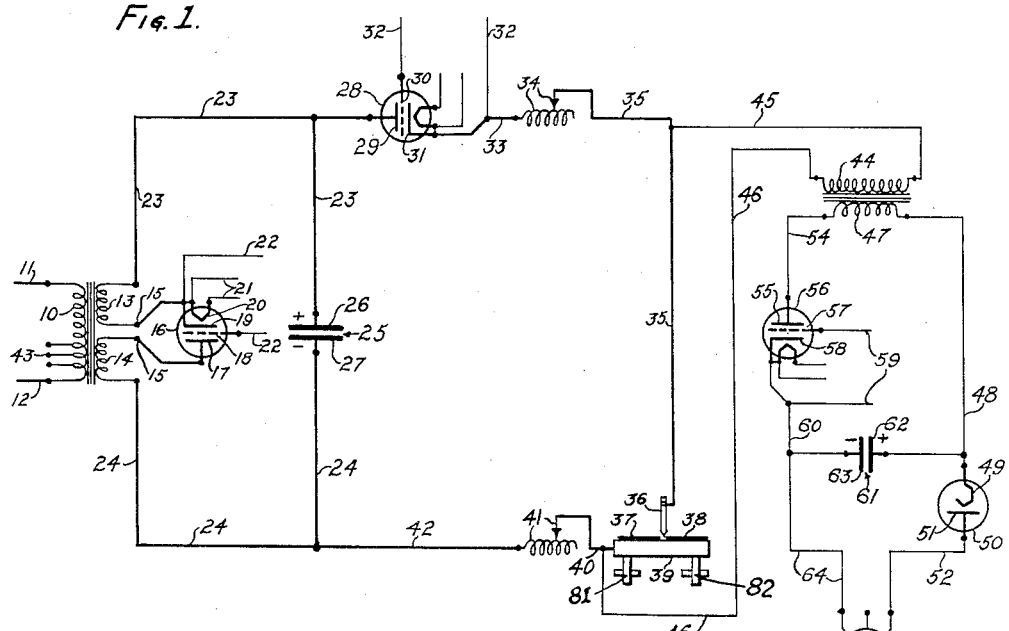
Fig. 1 is a diagram of an embodiment of the present invention to obtain fusion welding by means of an intermittent unidirectional condenser discharge.

Referring now to Fig. 1, the system here disclosed includes a power transformer 10 of any suitable size and construction, the primary of which is connected to any suitable alternating current supply through the leads 11 and 12. The secondary of said power transformer 10 is split into two parts 13 and 14, which are connected at 15 to controllable switching means capable of long life while carrying relatively high current and while closing and disconnecting in recurrent and rapid succession the current in the leads 15 at predetermined moments. Such practical means now available are the igniter controlled or the grid-controlled mercury vapor or gasfilled arc discharge devices, having either a mercury-pool cathode, such as the Ignitron, or a specially heated or thermionic cathode, such as the Thyratron. Either type of said controlled arc-discharge devices can be successfully used to effect the controlled switching of the leads 15 in the system, disclosed, provided the device chosen has a fairly high inverse voltage rating.

The switching device 16 illustrated in Fig. 1 is a gas-filled grid-controlled arc-discharge tube. Such tubes have the inherent property of unidirectional conduction, that is, the direction of the discharge current through them due to a potential of proper polarity, the so-called "forward" voltage, applied between the anode and the cathode of same, is always directed from the anode towards the cathode. A voltage of reversed polarity does not cause any current, provided said voltage does not exceed the inverse voltage rating of the particular grid-controlled rectifier tube. The initiation of the discharge, or the "ignition" of the tube, depends for a given "forward" voltage upon the grid potential in respect to the cathode, the critical value of the "grid bias,"—the "forward voltage-critical grid bias characteristic" being peculiar to each given tube. Once initiated the discharge through the tube stops only when, due to some external causes, the anode-cathode current falls to zero; the grid is ineffective during the discharge, even when the grid bias is changed to a value amply sufficient to prevent any reignition.

As illustrated, the grid-controlled arc-discharge rectifier 16 includes an anode 17, a control grid 18, and a cathode 19, said cathode being appropriately held at an elevated temperature required for the proper electron emission by means of the heater 20, which is energized by a suitable source (not shown) through leads 21. The grid 18 and the cathode 19 of the grid-controlled rectifier 16 are connected by means of the leads 22 to an ignition control circuit of any suitable character and construction, but preferably of the mechanical type known in the art, which employs a contactor driven by a synchronous motor energized by the same A. C. source supplying the power to the transformer 10. Said mechanical ignition control (not shown) is equipped with a brush or brushes, which engage the contactor mentioned, and which are suitably connected to the rectifier 16, the relative position of said contactor and brushes correctly predetermining the time at which the potential between the grid 18 and the cathode 19 is varied to initiate the ignition and thus effect the firing of the tube 16.

The opposite ends of the secondary 13, 14, of the power transformer 10, are connected through leads 23, 24 to a power condenser or capacitor 25 of fairly large capacity and any suitable construction, the plate 26 of which in the present hook-up is charged to a positive potential with respect to its plate 27. Connected to the lead 23 is a second gas-filled grid-controlled arc-discharge tube 28 similar in rating to the tube 16; its anode 29 is connected to the lead 23, and the leads 32 connect its control grid 30 and its cathode 31 to any suitable control element, but preferably to an element of the mechanical synchronously driven ignition distributor type hereinbefore referred to. As in the case of the grid-controlled rectifier first described, the cathode 31 of the tube 28 is also of an indirectly heated type.

The cathode 31 of the grid-controlled rectifier 28 is connected by the lead 33 with an adjustable inductance 34, which in turn is in circuit through the lead 35 with the welding electrode 36 disposed directly above and at the junction between the pieces of metal 37, 38 to be united, but leaving a gap on the order of one-sixteenth of an inch or more between said electrode 36 and the metal 37, 38. The two pieces of the work, diagrammatically indicated at 37 and 38, are shown as disposed on a work-table 39, to which they are usually firmly clamped. Above table 39 is made movable lengthwise of the seam being formed by means of the rollers 81, 82. Said table 39 is connected through lead 40 and a second adjustable inductance 41, and by means of the lead 42 and the lead 24, to the plate 27 of the capacitor 25 and the secondary 14 of the power transformer 10.

For the purpose of selective adjustment of the capacity of the power condenser 25 to fit the requirements of any particular welding operation it is advisable to subdivide the latter into smaller units connected in parallel.

For the same reason it is preferable to provide means for adjusting the secondary voltage of the power transformer 10. One of such means shown in Fig. 1 are the taps 43 on the primary of said transformer.

As to the value of the secondary voltage of the power transformer 10 it might be stated, that the higher said voltage—the smaller the capacity of the power condenser 25 required for any particular welding operation, since the energy stored in a condenser is proportional to the square of its voltage. However, for reasons of safety and economy (lower cost of capacitors and of the controlled discharge tubes), as well as considerations of structural difficulties of the grid-controlled gas-filled rectifiers employed (excessive bombardment of the cathode by positive ions, which is apt to destroy the electron emissive surface layer on same), it is advisable to keep the peak of the secondary voltage of the power transformer 10 below about two thousand volts.

If such a rule is followed, and since there is an air-gap of about one-sixteenth of an inch or more between the welding electrode 36 and the work pieces 37 and 38, as heretofore mentioned, the given setting of which is constantly maintained during the welding operation, and, furthermore, since the bridging of such an air-gap by an electric discharge requires a potential difference of about 4500 volts or more, it is obvious, that the energy stored in the charged power condenser 25 can not be discharged through such an air-gap without some auxiliary means, which, by producing an ionization within the region of said gap, would lower its apparent ohmic resistance and thus render the power discharge possible.

Such means can be either of radiant (X-ray or ultra violet ray beam, etc.), electrical (high-voltage low-energy A. C. spark discharge of low or high frequency, or a spark discharge of an unidirectional character, or, after the arc is struck, a sustained direct space current of low voltage), or thermo-chemical (flames produced by combustion of various substances) nature.

The preferred auxiliary means for ionizing the air-gap between the welding electrode 36 and the work pieces 37 and 38 utilized in conjunction with the present invention are of electrical nature, viz.: a high-voltage low-energy spark discharge of an unidirectional character having a recurring frequency of the commercial power supply.

It is expressly understood, that, although the circuit for producing the above stated high-voltage low-energy spark discharge is diagrammatically shown in all the figures of the present disclosure and described below as an auxiliary circuit in conjunction with the present invention, the special aspects and uses of said circuit are claimed in a separate application.

The above mentioned low power auxiliary circuit for ionizing the gap heretofore referred to as existing between the welding electrode 36 and the work 37, 38 is in shunt with the power circuit already described. As shown in Fig. 1, said auxiliary circuit includes a secondary coil 44 of an open core type induction coil, said secondary having its leads 45 and 46, respectively, connected to the leads 35 and 40 at the respective sides of the welding electrode and the work-table 39, the latter having any suitable construction and being made of metal. The primary 47 of said open core induction coil has one lead 48 connected to the cathode 49, which may be either directly heated or indirectly heated, of a half-wave rectifier tube 50, that has its anode 51 connected by lead 52 to one output terminal of a phase shifter 53 of any suitable construction. The other terminal of the primary coil 47 is connected through lead 54 with the anode 55 of a gas-filled grid-controlled rectifier tube 56 of a type similar to the tubes 16 and 28 but of lower rating, whose grid 57 and cathode 58 are connected by means of leads 59 to an ignition control circuit comprising a control element of any suitable character, but preferably another element of the ignition distributor of the mechanical synchronously driven type heretofore referred to as controlling the ignition or firing of the controlled discharge tubes 16 and 28. Connected to the cathode 58 of the controlled discharge tube 56 by lead 60 is a low voltage condenser 61 having its negative plate 63 connected to the lead 60, which is also connected through lead 64 to the other output terminal of the phase shifter 53 heretofore referred to, which phase shifter is energized from A. C. power mains having a frequency identical with that of the power source supplying the primary of the power transformer 10.

The use of auxiliary means for ionizing the gaseous medium of the gap between the welding electrode 36 and the work 37, 38 in order to increase the conductivity of said gap, one type of which device has just been described, is imperative when, as recommended according to reasons hereinbefore stated, the employed peak value of the secondary voltage of the power transformer 10 and, hence, the peak value, to which the power condenser 25 can be possibly charged, is kept below two thousand volts. However, if desired, said peak of the secondary voltage may be increased to such a value, that the voltage of the power condenser 25, to which said condenser can be possibly charged, will exceed the critical potential of the gap between the electrode 36 and the work 37, 38—especially when said gap is made smaller than in most cases preferred size of one sixteenth of an inch—and thus result in the power condenser discharge through the gap without any auxiliary ionization of the gaseous medium of same.

The electrical parameters of the system heretofore described may and should be suitably adjusted to conform with the conditions existing for a particular installation and particular piece of work to be done. Thus various thicknesses and different natures of metals to be united by the weld require discharges of various intensities, and these in turn require suitable adjustments of the inductances and the capacity employed in the circuit, as well as of the power input into the primary of the power transformer 10. Furthermore, the frequency of the A. C. supply to the power transformer 10 predetermines the optimum speed of the relative movement between the metal of the work and the welding electrode in order that the consequent discharges shall neither be spaced too far apart, nor spaced so closely together as to overlap and cause burning or perforation of the metal.

In view of the above discussed desirability of varying the parameters of the system in accordance with the optimum conditions required for any given piece of work to be performed, the parameters of said system are preferably made adjustable. As heretofore pointed out, the inductances 34 and 41, as well as the capacitor 25 are made adjustable. Similarly, the output of the power transformer 10 is also made adjustable, as by the provision of a plurality of taps 43 on its primary already mentioned, or any other suitable means, such as an autotransformer may be included within the primary circuit.

In order that the grids of the grid-controlled discharge tubes 16 and 28 may regain their control after each ignition as quickly and certainly as possible, the charging current of the power condenser 25, as well as its discharging current, should have an oscillatory character. This condition is satisfied by making the resistance of each of the charging and discharging circuits, respectively, as low as possible in order to satisfy in each case the relation, that the square of the resistance parameter of the particular circuit shall be less than four times the ratio of the inductive to the capacitive parameters of said circuit.

In operation the single phase alternating current supplied to the primary of the power transformer 10 produces a similarly alternating voltage in the secondary 13, 14 of said transformer; every other half-wave of said voltage coincides in vectorial direction with the "forward" potential between the anode 17 and the cathode 19 of the controlled discharge tube 16. During prevalence of such voltage alternation, which might be termed the "positive" half-cycle, the lead 23 is positive with respect to lead 24, and the power condenser 25 is charged to the desired potential as soon as the grid 18 in the control circuit 22 is actuated to ignite the controlled discharge tube 16. During the charging of the power condenser 25, the grid 30 in the control circuit 32 is blocking the controlled discharge tube 28, thus electrically disconnecting the welding electrode 36 from the power condenser 25.

The grid-controlled discharge tube 16 is ignited at a predetermined instant during the "positive" half-cycle of the secondary voltage of the power transformer 10 to close the circuit between the two halves of the secondary 13, 14 and the plates of the power condenser 25, completing the path for the condenser charging current. This firing moment for the tube 16 has to be carefully selected, and should occur after a suitable pause following the end of the previous discharge of the condenser 25 so as to avoid any overlap between the previous discharge and the succeeding charging of said condenser. By suitably shifting the ignition instant of the controlled discharge tube 16 so that it occurs either during the rise of the secondary transformer voltage, and preferably near its peak, or during the decline of said voltage, the charge of the power condenser 25 can be so regulated, that its final potential may have any desired value ranging from the peak of the secondary transformer voltage down to a few volts only.

While the power condenser 25 is being charged, the low voltage condenser 61 in the auxiliary circuit heretofore described is also being charged by means of the phase shifter 53 and the half-wave rectifier tube 60, said phase shifter 53 being suitably adjusted so that the two phenomena are occurring simultaneously or very nearly so. During the period that the condenser 61 is being charged, the grid 57 in the control circuit 59 is blocking the current flow through the controlled discharge tube 56 and hence no voltage is being induced in the secondary 44.

After the completion of the charging of the power condenser 25, which has a duration on the order of less than one thousand to a few thousand micro-seconds depending upon the parameters of the charging circuit, and the timing of the firing instant of the controlled discharge tube 16 in respect to the beginning of the "positive" half-cycle of the secondary voltage alternation, the charging current through the tube 16, by reason of its damped oscillatory character, has just completed its first or positive half-cycle, and falls to zero. At this instant the grid 18 of the controlled discharge tube 16 regains its control and prevents re-ignition of the same, electrically opening the previously closed circuit between the two halves of the secondary 13, 14. The controlled discharge tube 28 is now ignited at the predetermined instant, for which the control circuit 32 including the grid 30 is set, this instant being carefully chosen to introduce a pause between the end of the charging of the power condenser 25 and the beginning of the discharge. At the instant of ignition of the controlled discharge tube 28 the circuit is completed between the positively charged plate 26 of the power condenser 25 through the inductance 34 and lead 35 to the welding electrode 36, the negatively charged plate 27 of the power condenser 25 having a permanent electrical connection with the work-table 39 through the leads 24 and 42, the variable inductance 41 and the lead 40.

Thus, at the moment of the ignition of the controlled discharge tube 28, a potential difference is applied between the welding electrode 36 and the work-pieces 37, 38 disposed on the work-table 39, which constitute the terminals of the gap existing therebetween, said potential difference being almost equal to that existing between the plates 26 and 27 of the charged power condenser 25. This potential difference, in general, is in itself insufficient, as previously discussed, to bridge the gap mentioned and, therefore, a discharge of the power condenser 25 through the gap between the welding electrode 36 and the work-pieces 37, 38 would be rather uncertain without the application thereto of a superimposed high-voltage of coinciding polarity derived through the leads 45 and 46 from the low-power auxiliary circuit heretofore described.

The controlled discharge tube 56 of said low-power auxiliary circuit is ignited by means of the control circuit 59 at approximately the firing instant of the tube 28, thus discharging the low-voltage condenser 61 through the primary 47 of the open core induction coil, thereby inducing in its secondary 44 a voltage, which within a very short time (about 200 to 300 micro-seconds) attains a fairly high peak (about 5000 volts or more). The above secondary 44 in resect to its polarity is connected to the leads 45 and 46 in such a manner, that the vectorial direction of the voltage induced in 44 coincides with the polarity of the charged power condenser 25.

The high-voltage impulse generated in the secondary 44—having the alternative branch circuit through 34, 33, 28, 23, 13, 16, 14, 24, 42, 41 and 40, which is effectively blocked by the grid-controlled discharge tubes 28 and 16, regarding which the vectorial direction of said high-voltage impulse has an inverse course, and the choking action of the inductances 34, 13, 14 and 41—is applied through lead 35 and the welding electrode 36 to the gaseous medium of the air-gap between the latter and the work 37, 38 on the work-table 39, the latter being also in circuit with said secondary 44 through the lead 46. A spark is thus produced through said air-gap intensifying the ionization therein and, by considerably reducing its equivalent ohmic resistance, providing a ready path for the discharge of the power condenser 25. The duration of this power discharge is relatively short and said discharge is also relatively intense, but it is not of such character, due to the action of the properly set adjustable inductances 34 and 41, as to produce a spattering of the intensely heated molten metal of the spot of the junction between the work-pieces 37, 38 hit by the discharge.

After a suitable pause following the said power discharge through the welding electrode 36, during which the grid 30 of the discharge tube 28 regains control and, thus, electrically disconnects the power condenser 25 from the discharging branch 33, 34, 35, 36, 39, 40, 41 and 42 of the power circuit, the grid 18 of the controlled discharge tube 16 is actuated to re-ignite the same and the sequence of events as heretofore described is repeated. Throughout the subsequently recurring discharges from the electrode 36 the work 37, 38 and said welding electrode are moved relatively to each other in any suitable way lengthwise of the seam being formed as illustrated in Fig. 1 by the rollers 81, 82, the speed of the movement of the work being determined with respect to the frequency of the A. C. current supplied to the power transformer 10 so as to obtain, in case of the continuous seam, the proper partial overlapping of the succeeding points of application of the discharge to the joint.

Figure 2:
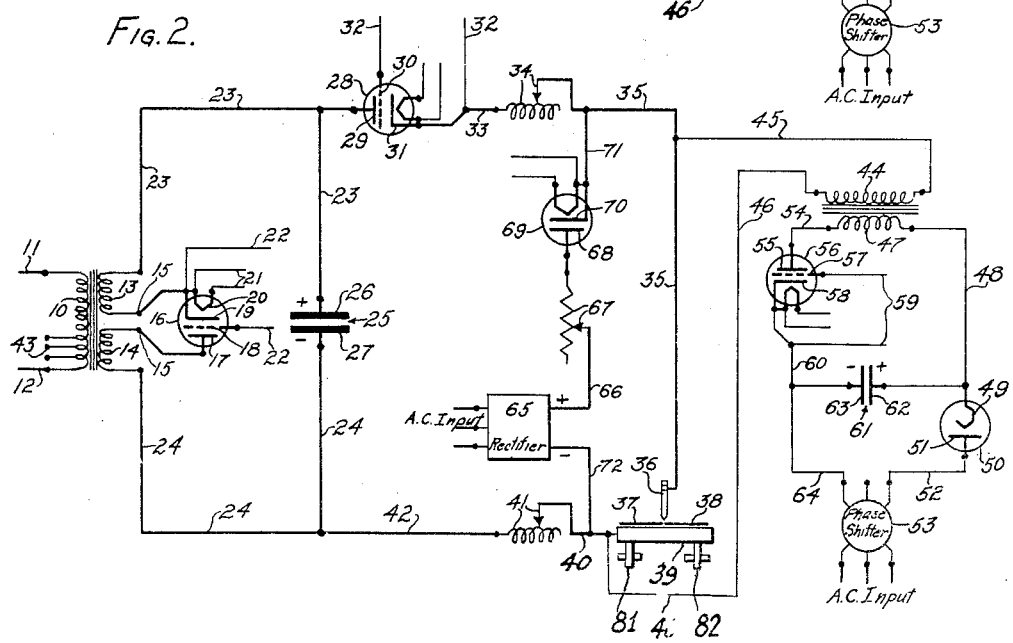
Fig. 2 illustrates another embodiment of the invention to obtain fusion welding by means of an intermittent unidirectional condenser discharge with a superimposed direct current arc discharge.

The system illustrated in Fig. 2 represents another embodiment of the present invention, and is preferable, when an application of a superior amount of energy to the weld combined with a more flexible control as to penetrability is in order.

In this embodiment a properly adjusted direct current arc discharge, derived from a suitable D. C. source, is superimposed upon the intermittent, unidirectional discharge produced by means identical with those already disclosed in connection with Fig. 1. The elements in Fig. 2, corresponding to those of Fig. 1, are marked, therefore, with the same reference characters, except the additional means, which, in the embodiment illustrated in Fig. 2, are used to superimpose the direct current discharge.

Said additional means, shown in Fig. 2, are connected in shunt with the lead 35, welding electrode 36, work-table 39 and lead 40, and consist of a source of direct current of a proper rating, such as a generator, or a rectifier of A. C. power, of any suitable construction, illustrated here diagrammatically at 65, the positive lead 66 of which is connected through an adjustable resistance 67 to the anode 68 of a half-wave rectifier tube 69 of an arc-discharge type, capable of passing relatively large current at a relatively low "forward" voltage, but having a fairly high inverse voltage rating, the cathode 70 of which is connected by means of the lead 71 to the lead 35 between the adjustable inductance 34 and the welding electrode 36; the negative lead 72 of the direct current source 65 is connected to the lead 40 between the work-table 39 and the adjustable inductance 41.

The part of the power circuit and the low-power high-voltage auxiliary circuit shown in Fig. 2, which correspond to the system disclosed in connection with the embodiment illustrated in Fig. 1, are entirely similar in their disposition, as well as in their operation; the description of same and the outline of their operation are, therefore, referred to the detailed description and the discussion of the operation of the embodiment shown in Fig. 1.

During the operation of the system illustrated in Fig. 2 the direct current source 65 sets up an unidirectional potential difference between the welding electrode 36 and the work-pieces 37, 38 disposed on the work-table 39, which potential difference has the same vectorial direction as the voltage intermittently appearing between the leads 35 and 40 during the intermittent unidirectional discharge of the power condenser 25. However, since said intermittent voltage is inverse in respect to the rectifier-valve 69, no current from said origin can flow through the shunt-branch containing the direct current source 65.

The unidirectional potential difference between 36 and 37, 38, just mentioned, causes during each discharge of the power condenser system a rush of direct current to flow from the source 65, lead 66, adjustable resistance 67, rectifier-valve 69, lead 71 to lead 35, and thence to the welding electrode 36, through the gaseous medium of the gap which is strongly ionized at that moment, the work 37, 38, the work-table 39 and the leads 40 and 72 back to the source 65. Depending upon the condition of the gap ionization, this direct current from the source 65 may continue to flow, although with diminished intensity, even during the pause between two successive intermittent discharges of said power condenser system which flow may be stopped, if desired, by adjustment of the resistance 67 to the proper value; or by the use of suitable means for limitation of said gap ionization, such, for example, as cooling of the tip of the electrode 36; or by application of both said measures.

Since the potential maintained between the leads 35 and 40 by the D. C. source 65 has a vectorial direction inverse to that of the controlled discharge tubes 28 and 16, no direct current can result from said origin through the branch of the power system consisting of 34, 33, 28, 23, 13, 16, 14, 24, 42 and 41.

There is, however, a small direct current leak of a few milliamperes flowing from the D. C. source 65 through the high resistance windings of the secondary 44 of the low power high-voltage induction coil belonging to the auxiliary circuit, said secondary 44 being in shunt through the leads 45 and 46 with the leads 35 and 40. This small direct current leak does no harm, but, if desired, it can be easily eliminated by placing in either lead—45 or 46—a properly inserted unidirectional rectifier-valve, as shown in connection with another embodiment of this invention illustrated in Fig. 4.

The direct current discharge through the gap between the welding electrode 36 and the work 37, 38, which is derived from the D. C. source 65, as heretofore explained, and the intensity of which is adjustable by means of the resistance 67, is superimposed, as a component discharge, upon the other component—the intermittent, unidirectional discharge of the power condenser 25 through the same gap, both component discharges merging into a resultant discharge of unusual flexibility, as to regulation of its intensity, and of a wide range of adaptability, as to variety of metals to be joined, and their gauge thicknesses.

While each intermittent discharge component delivers to the work 37, 38 what may be described as a brief and relatively intense packet of energy, which has a nature akin to a hammer blow and produces fusion at a relatively small spot during a relatively short time, that is insufficient to permit impurities to form within the bulk or on the surface of the molten metal, the direct current discharge component imparts additional energy to the work, which augments the penetrating effect and provides the pre-heating of the seam.

The requirements as to the electrical parameters of the embodiment illustrated in Fig. 2 are the same as those disclosed in connection with the embodiment shown in Fig. 1. Their values might be indicated by the following examples, in which the items listed next have been used throughout:

Frequency of the A. C. power supply—60 cycles per second;
Rating of the power transformer 10—15 k. v. a. with a 220 volts primary and 440 volts secondary, the latter having a resistance of about 0.08 ohm;
Lead resistance of the charging circuit—approximately 0.065 ohm;
Open core induction coil 44, 47—primary 47 consisted of 170 turns and had a resistance of 4 ohms and an inductance of about 1240 micro-henries; secondary 44 consisted of 12,000 turns, and had a resistance of 2480 ohms and an inductance of about 13 henries;
Capacity of the low-voltage condenser 61—four microfarads;
Voltage of the primary circuit including the primary 47 was on the order of 100 volts, giving a peak voltage across the secondary 44 in excess of 5,000 volts;
Peak value of the current through the primary 47 (oscillographically determined)—about 0.05 ampere;
Duration of the current through the primary 47 (oscillographically determined)—about 1700 micro-seconds;
Peak value of the current through the gaseous medium of the air-gap between the welding electrode 36 and the work 37, 38, which was generated in the secondary 44 (oscillographically determined)—about 17 milli-amperes;
Duration of the above spark current (oscillographically determined)—about 320 micro-seconds;
The D. C. source 65 was a full-wave power rectifier with a three-phase 220 volts input and a D. C. output rating of 10 k. w. at 60 volts.

No flux whatsoever was used in any of the welding examples stated below.

*Example 1.*—Welding of sheet brass (of 70% Cu, 30% Zn composition) sixteen thousandths of an inch thick.

The values of the parameters used:

Capacity of the power condenser 25—140 micro-farads;
Adjustable inductance 34—approximately 768 micro-henries; resistance of same—about 0.178 ohm;
Adjustable inductance 41—approximately 1080 micro-henries; resistance of same—about 0.23 ohm;
Primary current of the power transformer 10—about 48 amperes;
Direct current from the power rectifier 65—approximately 10 amperes;
Both currents have been read off meters located in the respective circuit branches;
Linear speed of the welding operation—about 8.5 feet per minute.
Result: A uniform, dense and ductile seam with excellent penetration, perfectly gas-tight. The welded seams of several pieces of tubing of 1½ inches inside diameter, made by pre-forming strips of the above brass and butt-welding the same, have been gas-tight and showed a very satisfactory strength; after heat-treatment, the ends of said welded tubing have been expanded in a single operation up to 2 inches of inside diameter without parting the seam.

*Example 2.*—Welding of sheet brass (of 70% Cu, 30% Zn composition) twenty-one thousandths of an inch thick.

The values of the parameters and currents employed:

Capacity of the power condenser 25—200 microfarads;
Adjustable inductances 34 and 41 were of approximately 1350 micro-henries and 0.28 ohm each;
Primary current (meter value) of the power transformer 10—about 55 amperes;
Direct current (meter value) from the power rectifier 65—approximately 16.5 amperes;
Result: Same as in Example 1.

*Example 3.*—Welding of a circular one sixteenth of an inch thick plate (of 70% Cu, 30% Zn composition), fitting inside of a piece of phosphor-bronze tubing of seven eighths of an inch inside diameter and ten thousandths of an inch wall thickness, to the end of said tubing to form the bottom of a cylindrical shell.

The values of the electric parameters and currents used:

Capacity of the power condenser 25—140 microfarads;
Adjustable inductance 34—approximately 950 micro-henries; resistance of same—about 0.21 ohm;
Adjustable inductance 41—approximately 830 micro-henries and the resistance—about 0.19 ohm;
Primary current of the power transformer 10 (meter value)—about 23.6 amperes;
Direct current (meter value) from the D. C. source 65—about 5.5 amperes.
Result: A uniform and well formed seam, perfectly gas-tight.

*Example 4.*—Welding of sheet aluminum one thirty-second of an inch thick.

The values of the electric parameters and currents employed:

Capacity of the power condenser 25—140 microfarads;
Adjustable inductance 34—approximately 770 micro-henries; resistance of same — about 0.175 ohm;
Adjustable inductance 41—approximately 1080 micro-henries; resistance of same—about 0.23 ohm;
Primary current (meter value) of the power transformer 10—about 48 amperes;
Direct current (meter value) from the source 65—about 13 amperes;
Linear speed of the welding operation—about 10 feet per minute (the maximum speed available of the installation on hand).
Result: Seam very satisfactory with excellent penetration, no porosity. Tubing of 1½ inches inside diameter, made by pre-forming aluminum strip and butt-welding the same, could be, after heat-treatment, easily expanded to one and three quarters inches and more without parting the seam.

*Example 5.*—Welding of hot-rolled sheet steel thirty-one thousandths of an inch thick.
The values of the parameters and currents used:

Capacity of the power condenser 25—140 microfarads;
Adjustable inductance 34 — approximately 830 micro-henries; resistance of same — about 0.188 ohm;
Adjustable inductance 41—approximately 1330 micro-henries; resistance of same—about 0.28 ohm;
Primary current (meter value) of the power transformer 10—approximately 60 amperes;
Direct current (meter value) from the source 65—about 13 amperes.
Result: Seam quite satisfactory; the somewhat limited penetration indicated the need of larger power, which could not be derived from the installation on hand.

The charging and the discharging operations of the power condenser 25 in an installation corresponding to the embodiment illustrated in Fig. 2, and using items hereinbefore listed in connection with the welding examples given above, have been photo-oscillographically investigated and furnished the following data for the values of parameters and currents employed listed below:

Capacity of the power condenser 25—140 microfarads;
Adjustable inductance 34—about 1000 micro-henries; resistance of same — approximately 0.22 ohm;
Adjustable inductance 41—about 830 micro-henries; resistance of same — approximately 0.19 ohm;
Primary current (meter value) of the power transformer 10—about 45 amperes;
Direct current (meter value) from the source 65—about 9.5 amperes.

The oscillographically determined values are:

Peak value of the charging current of the power condenser 25—was about 63 amperes;
Time elapsed between the start of the charging current and the peak of same—was approximately 450 micro-seconds;
Total duration of the power condenser 25 charging current—about 1800 micro-seconds;
Peak value of the discharge current of the power condenser 25, which is the intermittent component of the resultant discharge between the welding electrode 36 and the work 37, 38—was about 171 amperes;
Peak cathodic current density of the intermittent component discharge—was about 68 amperes per square millimeter, or about 6800 amperes per square centimeter;
Time elapsed between the start of the power condenser discharge and its peak—was approximately 700 micro-seconds;
Total duration of the power condenser discharge—was about 1580 micro-seconds;
Peak value of the direct current component of the resultant discharge between the welding electrode 36 and the work 37, 38—was about 17 amperes;
Peak cathodic current density of the direct current component discharge—was about 6.4 amperes per square millimeter or 640 amperes per square centimeter;
Peak cathodic current density of the resultant discharge between the welding electrode 36 and the work 37, 38—was approximately 74.4 amperes per square millimeter, or about 7440 amperes per square centimeter.

The above disclosed data give a distinct picture of the discharge mechanism, and, although pertaining to a specific installation and a particular setting of same, clearly indicate the features of the present invention, which radically differ from those of the welding methods practiced in the art.

The most striking fact is that the peak cathodic current density of the discharge through the air-gap between the welding electrode 36 and the work 37, 38, which, even in the case of this particular installation of a rather limited power and a relatively low output setting, is many times greater than the cathodic current density in the open air, which can be achieved by any of the means used now in the art (the cathodic current densities of arc-discharges in the air, as employed in the art, vary according to the welding electrodes used—for carbon electrodes said density is approximately 450 amperes per square centimeter, for iron electrodes it is about 900 amperes per square centimeter, and for copper electrodes said density can reach a value of about 2200 amperes per square centimeter).

It is, therefore, fully justifiable to refer to this characteristic feature of the present invention as a discharge of a relatively high current density, since said discharge has, in general, a cathodic current density, which at its peak is two or more times greater than any heretofore employed in the art, when using identical electrodes for welding similar materials.

The next distinctive feature of the present invention is the very short time during which the resultant discharge is actually effecting the melting of the work-metal. Although the total duration of said resultant discharge may be on the order of 1500 micro-seconds, as in the last instance stated, or possibly somewhat longer—practically about one third or more (depending on the thermal characteristics of the work-metal) of this in itself rather short span of time is used for pre-heating of the affected spot of the work and its partial annealing after the fusion, so that the actual melting of said confined spot of the work-metal takes place during only about 1000 micro-seconds or less. This very small fraction of a second is insufficient for the formation of any appreciable amounts of any deleterious compounds, such as oxides, nitrides, etc., and contamination of the surface or bulk of the molten globules of the work-metal by the same; the merging of said globules is, therefore, actually unobstructed by any appreciable surface films of foreign matter and, while proceeding generally without any need of protective fluxes, is resulting in a seam, the surface and the bulk of which are practically and actually free from any of the deleterious compounds heretofore mentioned.

The above feature of the present invention makes possible its successful general use for fluxless welding even of such hard weldable metals as aluminum.

Since the resultant discharge between the welding electrode 36 and the work 37, 38 in general, and, as hereinabove explained, its high current density portion, which effects the melting, in particular, requires a very short time of less than one two-hundredths of a second—it is, therefore, fully justifiable to refer to the second feature of the present invention as a span of time of a relatively short duration.

Another distinctive feature of the present invention is the rather steep front of the discharge between the welding electrode 36 and the work 37, 38, the quick rise and the subsequent relatively slower decline of the discharge current generally proceeding in a smooth unfaltering fashion. A substantially shorter time is required for the current of the discharge to reach its peak, than to decline afterwards from said peak to zero—an asymmetry in respect to its total duration which is characteristic to discharges of damped oscillatory character.

The combination of the relatively high voltage existing between the welding electrode 36 and the work 37, 38 during the discharge, which greatly accelerates the electrons in their collision activity in the direction of the gap-axis within the plasma-region of the discharge, of the steep discharge front, of the high current density, and of the very short duration of the whole phenomenon, produces an effect akin to a hammer blow on the spot of the work-metal affected by the discharge, considerably contributing to the density of the resulting seam, and, in respect to the magnetic blow under conditions when the same is strongly indicated, greatly if not entirely reduces the effect of said blow on the discharge proper.

Figure 3:
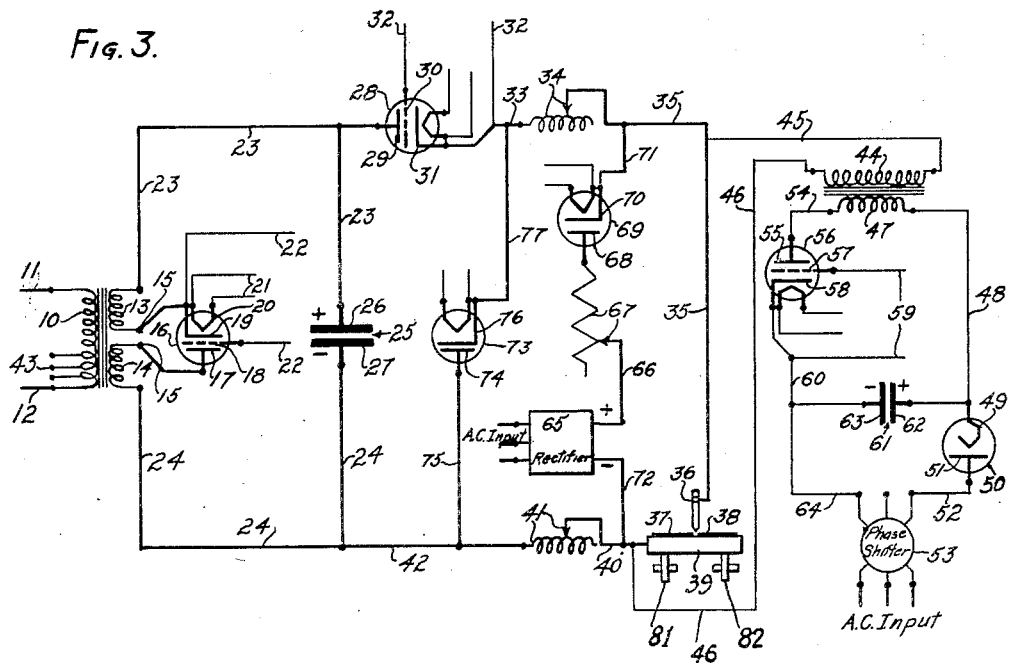
Fig. 3 illustrates an alternative embodiment of the invention.

In some cases it may be desirable to provide the discharge circuit with means whereby the so-called "inductive kick back," caused by the lumped and the distributed inductances in said circuit, might be eliminated. Thus, in the embodiments illustrated in Figs. 1 and 2 the inductances 34 and 41, and the distributed inductance in the circuit comprising 23, 28, 33, 35, 36, 37 and 38, 39, 40, 42 and 24—tend to charge the power condenser 25 to a potential, which is in a vectorial sense inverse to that prevailing during charging of same by means of the power transformer 10, and a provision to prevent such inverse charge may be desirable. Fig. 3 illustrates another embodiment of the welding circuit of the present invention, which includes such a provision, the charging and discharging circuits of this figure being the same as the circuits illustrated in Fig. 2, the same reference characters being employed to designate corresponding elements throughout, except for the provision of means to avoid the "inductive kick back" just referred to.

In Fig. 3 an unidirectional rectifying valve 73 of an arc-discharge type capable of passing relatively large current at a relatively low "forward" voltage, but having a fairly high inverse voltage rating, has its anode 74 connected by the lead 75 to the lead 42, and its cathode 76 connected by the lead 77 to the lead 33. Thus, when the discharge of the power condenser 25 takes place, the flow of the current from this source through the tube 73 is blocked due to the fact, that the potential difference between 33 and 42, set up by the discharge of the power condenser 25, is inverse in respect to the tube 73. For the same reason, neither the discharge of the low-power high-voltage auxiliary circuit, nor the voltage maintained between the leads 35 and 40 by the D. C. source 65, can cause any flow of current through the unidirectional valve 73. However, any tendency of the inductances in the discharge circuit, due to collapse of the electromagnetic field therein, to set up an inverse charge in the power condenser 25 is effectively prevented, since the unidirectional valve 73 serves as a by-pass for any current resulting from voltages generated in the lumped inductances 34 and 41, and in the distributed inductance in the circuit comprising 33, 35, 36, 37 and 38, 39, 40 and a part of 42.

The operation of the welding circuit illustrated in Fig. 3 is the same in principle, as that, shown in Fig. 2, as will be readily seen by comparison of the two circuits.

In the embodiments illustrated in Figs. 1, 2 and 3 only one half of each alternating wave of the A. C. single phase power supply is utilized in effecting the intermittent unidirectional discharge. The principle of the invention heretofore described may be utilized in a circuit containing provision whereby both halves of each alternating wave of the A. C. power supply may be utilized in sequence, thus doubling the number of discharges per second. This may be desirable in handling metal pieces of certain characteristics and thicknesses, as well as to obtain increase in the speed of the relative movement between the welding electrode and the work, because of the larger number of discharges per unit of time. Such a circuit, shown in Fig. 4, may be generally characterized as composed of two interconnected circuits of the type heretofore described in conjunction with Figs. 1 and 2, but employing suitable means to prevent any interaction between two halves of the circuit while the respective halves of each alternating wave of the A. C. power supply are being utilized.

Figure 4:
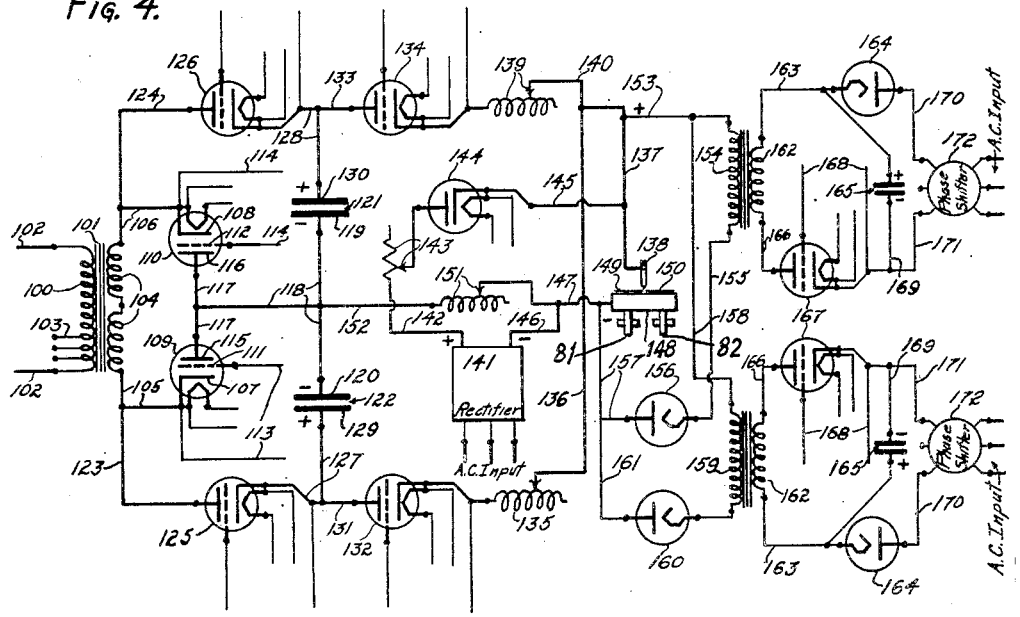
Fig. 4 illustrates yet another embodiment of the present invention to utilize both halves of each alternating current wave.

Referring in detail to Fig. 4, the primary 100 of the power transformer 101 is suitably connected through leads 102 to any suitable source of A. C. single phase supply, as in the embodiments illustrated in Figs. 1 and 2. Said primary 100, as also in the embodiments shown in Figs. 1 and 2, is preferably made adjustable by being provided with one or more additional taps 103. The secondary 104 of said power transformer 101 is not split, as in the embodiments of Figs. 1 and 2, but has its opposite terminals connected through leads 105 and 106 to the cathodes 107 and 108 of two gas-filled grid-controlled arc-discharge tubes 109 and 110, whose grids 111 and 112, together with their cathodes 107 and 108, respectively, are connected by means of the leads 113 and 114 to separate ignition control circuits providing suitable firing control, such as the synchronously driven contactors equipped with brushes referred to in describing the embodiment illustrated in Fig. 1. The anodes 115 and 116 of said controlled discharge tubes 109 and 110 are connected through leads 117 and 118 to the negative plates 119 and 120 of the power condensers 121 and 122.

Leads 105 and 106 are respectively connected through leads 123 and 124 to the gas-filled grid-controlled arc-discharge tubes 125 and 126, each of whose functions is comparable to the function of the controlled discharge tube 16 of the embodiments of Figs. 1 and 2, and whose grids and cathodes are in control circuits as particularly explained in connection with the embodiment illustrated in Fig. 1. Said tubes 125 and 126 are connected through leads 127 and 128 to the positive plates 129 and 130 of the power condensers 122 and 121, respectively. Lead 127 is connected through lead 131 to a gas-filled grid-controlled arc-discharge tube 132, and the lead 128 is similarly connected through lead 133 to a gas-filled grid-controlled arc-discharge tube 134, the tubes 132 and 134 being comparable in function to the tube 28 of the embodiment illustrated in Fig. 1, said tubes having their grids and cathodes in control circuits as there explained.

The cathode of the controlled discharge tube 132 is connected through the adjustable inductance 135 to lead 136, which is connected through lead 137 to the welding electrode 138, and similarly the cathode of the controlled discharge tube 134 is connected through adjustable inductance 139 to lead 140, also connected to the lead 137 extending to the welding electrode 138. As in the embodiment illustrated in Fig. 2, lead 137 is also connected to any suitable source of direct current, such as a generator or a rectifier of A. C. power, Fig. 4 diagrammatically indicating a rectifier at 141, whose positive terminal is connected through lead 142 and an adjustable resistance 143 to the anode of a half-wave rectifier tube 144 of the arc-discharge type, capable of passing relatively large current at a relatively low "forward" voltage, but having a fairly high inverse voltage rating, whose cathode is connected through the lead 145 to the lead 137, said rectifying tube 144 functioning here as an unidirectional valve, similar to the tube 69 of the embodiment illustrated in Fig. 2. The negative terminal of the D. C. source 141 is connected through the lead 146 to the lead 147, which is connected at one end with the work-table 148 carrying the work pieces 149 and 150, and at its other end is connected through the adjustable inductance 151 to the lead 152, which in turn is connected to the lead 118.

Also connected with the leads 137 and 147 are two auxiliary low-power high-voltage circuits for ionizing the gaseous medium of the air-gap between the electrode 138 and the work 149, 150, which are similar as to the disposition of their elements, especially in their low-voltage circuits, and their function, to the auxiliary circuit described in connection with the embodiment illustrated in Fig. 1. The lead 137 is connected through the lead 153 to the secondary 154 of an open core induction coil, the opposite terminal of said secondary 154 being connected through lead 155 to a half-wave rectifier tube 156 of relatively high inverse voltage, which is employed here as an unidirectional valve, whose anode is connected through lead 157 to lead 147, which is in turn connected to the work-table 148, which is made movable lengthwise of the seam being formed by means of the rollers 81, 82. Also connected to lead 153 is a lead 158 extending to the secondary 159 of a second open core induction coil of the same character as 154 and having its opposite terminal connected to a half-wave rectifier tube 160 of relatively high inverse voltage, comparable to 156, which is also employed here as an unidirectional valve. The anode of this latter tube is also connected through lead 161 to lead 157.

Each of the secondaries 154 and 159 is associated with a separate circuit for inducing relatively high voltage therein and as the two circuits are identical—it will be sufficient to describe one, the same reference characters being used in connection with each of said circuits.

Associated with the secondary of each open core induction coil is a primary 162 connected at one terminal through the lead 163 to the cathode of a small half-wave rectifier tube 164, and also to the positive plate of a condenser 165 of relatively low voltage rating, said small rectifier tube 164 being of the gas-filled type capable of passing relatively large current at a relatively low "forward" voltage. The opposite terminal of said primary 162 is connected through lead 166 to the anode of a gas-filled grid-controlled discharge tube 167 whose grid and cathode are connected by means of leads 168 to an ignition control circuit as in the case of the comparable circuit 59 of the embodiment illustrated in Fig. 1. The cathode of the controlled discharge tube 167 is connected through the lead 169 to the negative plate of the condenser 165. The anode of the rectifier tube 164 and the lead 169 are respectively connected through leads 170 and 171 to the output terminals of a phase shifter 172, which may be of the same construction as the phase shifter marked 53 in the embodiment illustrated in Fig. 1. The two phase shifters 172 of both primary circuits of the two high-voltage low-power auxiliary systems are so adjusted, that they are alternately charging the respective low-voltage condensers 165, each phase shifter thus utilizing a corresponding half of each alternating wave of the A. C. supply; in other words, the phase shifters 172 are adjusted to be 180 electrical degrees out of phase in respect to each other.

The operation of the circuit just described will be apparent from the description of the embodiments illustrated in Figs. 1 and 2. Briefly, the first half of each alternation supplied by the secondary 104 of the power transformer 101, the vectorial direction of which coincides with the forward voltage of the gas-filled grid-controlled discharge tubes 126 and 109, will charge the power condenser 121 when the controlled discharge tubes 126 and 109 are ignited. It is obvious, that the discharge through each of said tubes 126 and 109 must occur at the same time and, therefore, they must be fired simultaneously by the ignition control heretofore referred to; thus, when said discharge tubes 126 and 109 are ignited, the circuit is completed from the secondary 104 of the power transformer 101 through the lead 124, the controlled discharge tube 126, lead 128, power condenser 121, lead 118, lead 117, the controlled discharge tube 109 and lead 105 to the other terminal of the secondary 104. During the other half-wave the secondary 104 produces a forward voltage in respect to the controlled discharge tubes 125 and 110, and the other power condenser 122 is charged when the tubes 125 and 110 are simultaneously ignited, the circuit now being through the lead 105, lead 123, controlled discharge tube 125, lead 127, the power condenser 122, lead 118, lead 117, the controlled discharge tube 110 and lead 106 to the upper terminal of the secondary 104. Upon ignition of the controlled discharge tube 134 at a proper instant, as heretofore explained in conjunction with the embodiment illustrated in Fig. 1, at which time the controlled discharge tubes 126 and 109 are not ignited, the power condenser 121 is discharged through the work circuit including the controlled discharge tube 134, the adjustable inductance 139, the leads 140 and 137, the welding electrode 138, the work-pieces 149, 150, the work-table 148, the lead 147, the adjustable inductance 151, and the leads 152 and 118; the controlled discharge tube 134 is ignited in accordance with the principles heretofore explained in conjunction with the embodiment illustrated in Fig. 1, after a suitable pause between the charging operation and the discharging procedure. Similarly, when the controlled discharge tube 132 is ignited, at which time the controlled discharge tube 125 does not carry any current, the power condenser 122 is discharged through the work circuit including elements 127, 131, 132, 135, 136, 137, 138, 149 and 150, 148, 147, 151, 152 and 118.

As in the embodiment illustrated in Fig. 2, the source of direct current 141 imposes at all times, through the unidirectional valve 144, a direct potential between the welding electrode 138 and the work-pieces 149 and 150, which results in a direct current component discharge through the gaseous medium of the gap therebetween, the other component—the discharge of each power condenser—being simultaneous with the gap-ionizing discharge of the corresponding high-voltage low-power auxiliary circuit.

The parameters of the embodiment of Fig. 4 may be selected in accordance with the principles heretofore explained in conjunction with the embodiment illustrated in Fig. 1 and further discussed in connection with Fig. 2. These parameters must be consistent with the requirements of oscillatory character for the charging and discharging current as before explained.

It is to be understood that in connection with all of the foregoing embodiments suitable means are provided for effecting a relative movement between the welding electrode and the metal pieces to be united, which are disposed on the work-table, as illustrated by the rollers 81, 82 in each figure.

In the embodiments illustrated on the drawings the gas-filled grid-controlled discharge tubes and the half-wave rectifying tubes have been illustrated as respectively using indirectly heated and directly heated cathodes, as diagrammatically indicated by the heating circuits connected therewith, and the arrangements so illustrated are those preferred in view of the present characteristics of the discharge tubes available, but it is to be expressly understood, that the invention is not restricted to the manner of the cathode heating, provided that the tubes, whether the gas-filled grid-controlled rectifiers or the half-wave rectifying valves, are possessed of the characteristics necessary for the performance of their respective functions as hereinbefore set out.

In the embodiments hereinbefore described the gas-filled grid-controlled discharge tubes have been explained as respectively connected into control circuits suitably actuated in timed sequence, so as to produce the ignition or firing of said tubes at the proper intervals of time in order to obtain the manner of operation hereinbefore explained, and, as before indicated, the means for so controlling said circuits preferably takes the form of synchronously driven contactors with their respective brush or brushes electrically connected to the several control circuits in a manner that will be understood by those skilled in the art, but it is to be expressly understood, that the invention is not necessarily restricted to the use of such a mechanical control mechanism, as any other suitable control means, that will effect the ignition of the respective controlled discharge tubes in proper sequence and with the proper time intervals may be employed within the broader aspects of the present invention.

The gas-filled grid-controlled discharge tubes of the trigger-acting grid (Thyratron) type have been preferably employed in the several embodiments hereinbefore described as switching means to effect the operation of the present invention since, as heretofore mentioned, such tube type is the practical means of proper switching characteristics now available. It is expressly understood, however, that the present invention is not restricted to the use of a particular type of controlled discharge tubes, since other types of controllable electron- or arc-discharge devices, such as, for instance, the so-called "ionic amplifier" type, the principle of which is disclosed in U. S. Patent No. 1,850,967, or even some other more or less mechanical types, such as, for example, the switching gear based on principles disclosed in U. S. Patents Nos. 1,851,704, 1,919,633, 1,930,933 and 2,051,708, may be also used, with proper adaptation to the requirements of the present invention, to practice the same.

Other possible changes will now readily suggest themselves to those skilled in the art as respects circuit connections and arrangements and the form of the electrical elements thereof without departing from the principles and manners of operation hereinbefore set forth, and such are intended to be embraced within the present invention.

It will, therefore, be perceived, that the present invention provides a novel method and system of electric welding, which is available for uniting pieces of metal of relatively thin stock, or metal of relatively thin stock to relatively thin stock, or pieces of metal of relatively heavy stock. The present invention practically eliminates the instabilities of the arc in fusion welding, thereby overcoming pitting, burning, variations of melting intensity, gaps in the welded seams, cavitation and other irregularities in the characteristics of the resulting seam. The latter, produced by the present invention, is regular in character and, owing to the manner in which it is formed, the fused metal may quickly resume its normal state after fusion without material changes in the surrounding metal and without contamination of the fused metal that may interfere with the desired subsequent recrystallization, thus avoiding deleterious effects that generally result in mechanical weakness of the joint. The resulting seam is strong, dense—due to the pounding effect of the intermittent discharge of relatively high intensity—and ductile, and thus is capable of withstanding severe bending strains without being opened up. The procedure of the present invention enables the seams to be formed at relatively high speeds, and it is also available for use with such metals as aluminum that have heretofore been welded only with difficulty. The welding may be effected without the use of fluxes, although, if preferred, fluxes may be employed.

At the same time the system and procedure of the present invention do not involve highly complicated and expensive equipment, but enable the production of strong, regular, durable seams at a reasonable cost.

While the embodiments of the present invention heretofore referred to have been described with considerable particularity, it is to be expressly understood, that the invention is not limited thereto, as the invention is capable of receiving a wide variety of expressions, others of which will now be apparent to those skilled in the art, while changes may be made in the details of arrangement, and the parameters of the electrical systems may be varied in accordance with variations in the work to be done, etc., without departing from the spirit of the present invention. Reference is therefore to be had to the appended claims for a definition of the invention.

What is claimed is:

1. A method of welding by fusion of the metal parts to be joined comprising the steps of bringing the parts to be joined into proper welding relationship with one another and with a welding electrode, intermittently storing energy, isolating the work circuit from the storage circuit while said energy is being stored, and intermittently releasing said energy, thus producing a sequence of unidirectional, intermittent arc discharges of relatively high current density and of relatively short duration through the gaseous medium of the gap between said electrode and said metal parts to be joined.

2. A method of forming a welded seam between the work-parts to be joined which includes the step of subjecting said work-parts to a sequence of regularly recurring unidirectional arc discharge impulses through the gaseous medium of the gap between said parts and a welding electrode, each said discharge impulse consisting of two superimposed discharges caused by potentials of coinciding vectorial directions, the first component discharge having a relatively high current density and being of relatively short duration, and characterized by a wave form of a rather steep front, and the second component being a current pulsation.

3. A method of welding by fusion of the metal parts to be joined with a circuit comprising a power condenser, which includes the steps of producing an ionization of the gaseous medium of the gap between an electrode and said metal parts in order to increase the conductivity of said medium, intermittently charging said power condenser, isolating said gap from said condenser during charging and intermittently discharging said condenser through said gap, thereby producing a sequence of unidirectional, intermittent arc discharges of relatively high current density and of relatively short duration through said ionized medium of said gap.

4. A method of forming a welded seam between the work-parts to be joined which includes the steps of producing an ionization of the gaseous medium of the gap between an electrode and said work-parts by an unidirectional space current flow in order to increase the conductivity of said medium, and subjecting said work-parts to a sequence of regularly recurring unidirectional arc discharge impulses, which are vectorially coincident with said ionizing space current, through said ionized medium of said gap, each said discharge impulse consisting of two superimposed discharges caused by potentials of coinciding vectorial directions, the first component having a relatively high current density and being of relatively short duration and characterized by a wave form of a rather steep front, and the second component being a direct current pulsation.

5. A method of forming a welded seam between the work-parts to be joined which includes the steps of intermittently storing energy while isolating the work-parts therefrom, subjecting said work-parts to a sequence of intermittent, regularly recurring, unidirectional arc discharges of relatively short duration and of relatively high current density through the gaseous medium of the gap between an electrode and said work-parts, each of said arc discharges being superimposed upon a correspondingly single, simultaneously occurring low power spark discharge of relatively high voltage and of a vectorial direction coinciding with that of said arc discharge, each of said spark discharges by producing a momentarily increased ionization of said gaseous medium of said gap permitting the passage of said correspondingly superimposed arc discharge.

6. A method of forming a welded seam between the work-parts to be joined which includes the step of subjecting said work-parts to a sequence of regularly recurring unidirectional arc discharge impulses through the gaseous medium of the gap between said parts and a welding electrode, each said discharge impulse consisting of two superimposed discharges caused by potentials of coinciding vectorial directions, the first component having a relatively high current density and being of relatively short duration and characterized by a wave form of a rather steep front, and the second component being a direct current pulsation, each of said discharge impulses being associated with and superimposed upon a correspondingly single, simultaneously occurring auxiliary low power spark discharge of relatively high voltage and of a vectorial direction coinciding with that of said discharge impulses, each of said spark discharges by producing a momentarily increased ionization of said gaseous medium of said gap permitting the passage of said correspondingly superimposed discharge impulse.

7. A method of fusion welding with a circuit comprising a power condenser which comprises intermittently storing energy in said condenser while isolated from the work circuit, superimposing a series of unidirectional high voltage-low current arc discharges upon a series of low voltage-high current arc discharges of similar vectorial direction in synchronism therewith, and passing said discharges through the parts to be joined.

8. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for storing energy while isolating the work-parts therefrom, and means for intermittently releasing said energy to create a sequence of intermittent, regularly recurring, unidirectional arc discharges of relatively short duration and of relatively high current density through the gaseous medium of said gap.

9. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for creating a sequence of intermittent, regularly recurring, unidirectional arc discharges of relatively short duration and of relatively high current density, characterized by a wave form of a rather steep front, through the gaseous medium of said gap, and means for producing and superimposing upon each of said arc discharges a discharge consisting of a direct current pulsation having a vectorial direction coinciding with that of the corresponding arc discharge.

10. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for increasing the conductivity of said gap by ionization, a power condenser, means for intermittently charging said condenser and discharging it through said gap, thereby producing a sequence of intermittent, regularly recurring, unidirectional arc discharges of relatively short duration and of relatively high current density through said ionized medium of said gap, and means for isolating said condenser from said gap during charging.

11. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for producing an unidirectional space current flow through the gaseous medium of said gap for the purpose of increasing its conductivity by ionization, means for creating a sequence of intermittent, regularly recurring, unidirectional arc discharges of relatively short duration and of relatively high current density, characterized by a wave form of a rather steep front, through said ionized medium of said gap, and means for producing and superimposing upon each of said arc discharges a discharge consisting of a direct current pulsation having a vectorial direction coinciding with that of the corresponding arc discharge.

12. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for creating a sequence of intermittent, regularly recurring, unidirectional low power spark discharges of relatively high voltage through the gaseous medium of said gap for the purpose of momentarily increasing the conductivity of said medium by ionization, and means for producing and superimposing upon each of said spark discharges a simultaneously occurring arc discharge of relatively short duration and of relatively high current density and having a vectorial direction coinciding with that of the associated spark discharge.

13. In a system for fusion welding of metal parts to be joined, a welding electrode adapted to be positioned closely adjacent to but separated from said parts by a gap, means for effecting relative movement between said electrode and said metal parts in the direction of the welded seam to be formed, means for creating a sequence of intermittent, regularly recurring, unidirectional low power spark discharges of relatively high voltage through the gaseous medium of said gap for the purpose of momentarily increasing the conductivity of said medium by ionization, and means for producing and superimposing upon each of said spark discharges two component arc discharges each having a vectorial direction coinciding with that of the associated spark discharge, the first of said component arc discharges being of relatively short duration and of relatively high current density, and characterized by a wave form of a rather steep front, and the second of said component arc discharges being a direct current pulsation.

14. Welding apparatus comprising a work circuit, a storage circuit, means for intermittently storing energy in said storage circuit, means for isolating said work circuit from said storage circuit while energy is being stored, means for producing in said work circuit a series of unidirectional low voltage-high current arc discharges, means for producing a series of high voltage-low current arc discharges of similar vectorial direction in synchronism therewith, and means for superimposing said discharges and simultaneously passing them through the parts to be joined.

15. A welding circuit composed of two interconnected component circuits, the first component circuit consisting of an alternating current source, a power condenser, and controllable means for intermittent, unidirectional charging of said condenser, the second component circuit including that part of said first component circuit which contains the power condenser, and further consisting of a first adjustable inductance, a welding electrode, a gap between said electrode and the work-parts to be joined disposed upon a work supporting device, said work supporting device, a second adjustable inductance, and controllable means for intermittent, unidirectional discharging of said power condenser through said second component circuit.

16. A welding circuit composed of two interconnected component circuits associated with a third circuit of an auxiliary nature, the first component circuit consisting of an alternating current source, a power condenser, and controllable means for intermittent, unidirectional charging of said condenser, the second component circuit including that part of said first component circuit which contains the power condenser, and further consisting of a first adjustable inductance, a welding electrode, a gap between said electrode and the work-parts to be joined disposed upon a work-supporting device, said work-supporting device, a second adjustable inductance, and controllable means for intermittent, unidirectional discharging of said power condenser through said second component circuit, the third auxiliary circuit being connected in shunt with said welding electrode and said work-supporting device of the second component circuit and consisting of means for producing spark discharges of relatively high voltage between said welding electrode and said work-parts to be joined, and means for superimposing each of said spark discharges upon a corresponding one of said intermittent arc discharges.

17. A welding circuit composed of three interconnected component circuits associated with a fourth circuit of an auxiliary nature, the first component circuit consisting of an alternating current source, a power condenser, and controllable means for intermittent, unidirectional charging of said condenser, the second component circuit including that part of said first component circuit which contains the power condenser, controllable means for intermittent, unidirectional discharging of said power condenser, a first adjustable inductance, a welding electrode, a gap between said electrode and the work-parts to be joined disposed upon a work-supporting device, said work-supporting device, and a second adjustable inductance, the third component circuit consisting of a source of direct current, an adjustable resistor, an unidirectional valve, and that part of the second component circuit which contains said welding electrode, said gap, said work-parts, and said work-supporting device, one terminal of said direct current source being connected through said adjustable resistor and unidirectional valve to said welding electrode, and the other terminal being connected to said work-supporting device, the fourth auxiliary circuit being connected in shunt with said welding electrode and said work-supporting device of said second component circuit and consisting of means for producing spark discharges of relatively high voltage between said welding electrode and said work-parts to be joined, and means for associating each of said spark discharges with, and superimposing each of them upon a corresponding one of said intermittent arc discharges.

18. A welding system consisting of an energy source, a power condenser, controllable means for intermittently charging said power condenser, an inductance, a welding electrode, a work-supporting device, controllable means for intermittently discharging said power condenser through said inductance, said welding electrode, and the work-parts disposed on said work-supporting device, and by-pass means of an unidirectional character for preventing an inverse charging of said power condenser by the energy generated in said inductance during the collapse of the magnetic field built-up in said inductance by said power condenser discharge.

19. A welding circuit for utilization of both halves of each complete alternation of the alternating current power supply, said welding circuit comprising five interconnected, component circuits and two additional, associated circuits of an auxiliary nature, the first component circuit consisting of an alternating current source, a first power condenser and controllable means for intermittent, unidirectional charging of said first power condenser, the second component circuit including that part of said first component circuit which contains said first power condenser, controllable means for intermittent, unidirectional discharging of said first power condenser, a first adjustable inductance, a welding electrode, a gap between said electrode and the work-parts to be joined disposed upon a work-supporting device, said work-supporting device, and a second adjustable inductance, the third component circuit being essentially in parallel with the first component circuit but having its operation shifted approximately one hundred and eighty electrical degrees with respect to that of said first component circuit, said third component circuit consisting of the aforesaid alternating current source, a second power condenser, and controllable means for intermittent, unidirectional charging of said second power condenser at a time, when said first power condenser is disconnected from the common alternating current source, the fourth component circuit being essentially in parallel with said second component circuit and including that part of said third component circuit which contains for intermittent, unidirectional discharging of said second power condenser at a time when said second component circuit is inactive, third adjustable inductance, and that part of said second component circuit which includes said welding electrode, said gap between said electrode and work-parts to be joined disposed upon said work-supporting device, said work-supporting device, and said second adjustable inductance, the fifth component circuit consisting of a source of direct current, an adjustable resistor, an unidirectional valve, and including that part of said second component circuit which contains said welding electrode, said gap, and said work-supporting device, one terminal of said direct current source being connected through said adjustable resistor and unidirectional valve to said welding electrode, and the other terminal being connected to said work-supporting device, the two additional, auxiliary circuits being structurally identical, but having the sequence of their operations shifted approximately one hundred and eighty electrical degrees with respect to each other, each of said auxiliary circuits being connected in shunt through an unidirectional valve, located in one of its branches, with said welding electrode and said work-supporting device of said second component circuit, and consisting of means for producing spark discharges of relatively high voltage between said welding electrode and said work-parts to be joined, and means for associating each of said spark discharges with, and superimposing each of them upon a corresponding one of said intermittent arc discharges.

20. An electric arc welding circuit comprising a condenser, means for intermittently charging said condenser, a work circuit comprising an electrode, a gap, and metal pieces to be joined, means for isolating said work circuit from said condenser while said condenser is being charged, and means for intermittently discharging said condenser through said work circuit including said gap, with a cathodic current density of at least 3,000 amperes per square centimeter.

21. An electric arc welding circuit comprising a condenser, means for intermittently charging said condenser, a work circuit comprising an electrode, a gap, and metal pieces to be joined, means for isolating said work circuit from said condenser while said condenser is being charged, and means for intermittently discharging said condenser through said work circuit including said gap in not more than 5,000 micro-seconds.

22. An electric arc welding circuit comprising a condenser, a work circuit comprising an electrode, a gap, and pieces of metal to be joined, means for intermittently charging said condenser, means for isolating said work circuit from said condenser while said condenser is being charged, and means for intermittently discharging said condenser through said work circuit including said gap in not less than 200 micro-seconds and not more than 5,000 micro-seconds.

23. An electric arc welding circuit comprising a condenser, a work circuit comprising an electrode, a gap, and pieces of metal to be joined, means for intermittently charging said condenser, means for isolating said work circuit from said condenser while said condenser is being charged, and means for intermittently discharging said condenser through said work circuit including said gap in not less than 200 micro-seconds and not more than 5,000 micro-seconds, whereby a cathodic current density of at least 3,000 amperes per square centimeter is produced.

24. A welding system, comprising a power condenser, controllable means for intermittently charging said power condenser, an inductive reactance, controllable means for intermittently discharging said power condenser through said inductive reactance, and by-pass means of an unidirectional character for preventing an invers[e] charging of said power condenser by the energ[y] released by said inductive reactance during th[e] collapse of the magnetic field of said inductiv[e] reactance, said energy having been built up an[d] stored in the magnetic field of said inductive reactance by said power condenser discharge.

ALEXANDER RAVA.

CERTIFICATE OF CORRECTION.

Patent No. 2,235,385.                                   March 18, 1941.

ALEXANDER RAVA.

It is hereby certified that error appears in the printed specification of the above numbered patent requiring correction as follows: Page 4, second column, line 74, for "resect" read --respect--; page 13, second column, line 1, claim 19, after the word "contains" insert --the second power condenser, controllable means--; and that the said Letters Patent should be read with this correction therein that the same may conform to the record of the case in the Patent Office.

Signed and sealed this 27th day of May, A. D. 1941.

(Seal)
                                                    Henry Van Arsdale,
                                       Acting Commissioner of Patents.